(12) United States Patent
Nagashima et al.

(10) Patent No.: US 12,055,382 B2
(45) Date of Patent: Aug. 6, 2024

(54) STRAIN DISTRIBUTION MEASUREMENT SYSTEM AND STRAIN DISTRIBUTION MEASUREMENT METHOD THAT MEASURE STRAIN DISTRIBUTION BASED ON DISTRIBUTION OF REFLECTANCE OR POLARIZATION CHARACTERISTIC

(71) Applicant: SHIMADZU CORPORATION, Kyoto (JP)

(72) Inventors: Tomotaka Nagashima, Kyoto (JP); Yukimitsu Iwanaga, Kyoto (JP); Norio Hirayama, Tokyo (JP)

(73) Assignee: SHIMADZU CORPORATION, Kyoto (JP)

( * ) Notice: Subject to any disclaimer, the term of this patent is extended or adjusted under 35 U.S.C. 154(b) by 245 days.

(21) Appl. No.: 17/325,212

(22) Filed: May 20, 2021

(65) Prior Publication Data

US 2021/0364276 A1    Nov. 25, 2021

(30) Foreign Application Priority Data

May 22, 2020    (JP) ................................. 2020-089381

(51) Int. Cl.
*G01B 11/16*    (2006.01)
*G01N 3/08*    (2006.01)

(52) U.S. Cl.
CPC ............. *G01B 11/168* (2013.01); *G01N 3/08* (2013.01); *G01N 2203/0017* (2013.01); *G01N 2203/0647* (2013.01)

(58) Field of Classification Search
CPC ......... G01L 1/24; G01L 5/0047; G01B 11/16; G01B 11/25; G01B 11/168; G01B 11/165; G01N 3/08; G01N 2203/0017; G01N 2203/0075; G01N 2203/0647
See application file for complete search history.

(56) References Cited

U.S. PATENT DOCUMENTS

| 10,761,002 | B1 * | 9/2020 | Foecke | ................ G01L 1/24 |
| 11,410,324 | B2 * | 8/2022 | Bagersad | ............. H04N 13/221 |
| 2014/0033799 | A1 * | 2/2014 | Newman | ................ G01N 25/00 374/57 |

(Continued)

FOREIGN PATENT DOCUMENTS

| EP | 2631644 | A1 * | 8/2013 | ......... G01N 21/8986 |
| JP | 2000146787 |  | * 5/2000 | ............ G01B 11/16 |

(Continued)

OTHER PUBLICATIONS

"Office Action of Japan Counterpart Application", issued on Jun. 27, 2023, with English translation thereof, p. 1-p. 5.

(Continued)

*Primary Examiner* — Michael P LaPage
(74) *Attorney, Agent, or Firm* — JCIPRNET

(57) ABSTRACT

A strain distribution measurement system includes a tensile tester that deforms a test piece to measure mechanical properties of a material of the test piece, and a strain distribution measuring device that measures a strain distribution of the test piece. The strain distribution measuring device measures the strain distribution of the test piece based on a distribution of at least one of a reflectance or a polarization characteristic on the main face of the test piece.

8 Claims, 7 Drawing Sheets

(56) References Cited

U.S. PATENT DOCUMENTS

| | | | |
|---|---|---|---|
| 2018/0224341 A1* | 8/2018 | Sakamoto | G01L 1/24 |
| 2019/0271537 A1* | 9/2019 | Kontsos | G01M 11/081 |
| 2019/0385326 A1* | 12/2019 | Baqersad | H04N 13/243 |

FOREIGN PATENT DOCUMENTS

| | | |
|---|---|---|
| JP | 2009276088 | 11/2009 |
| JP | 2011174874 | 9/2011 |
| JP | 2016156763 | 9/2016 |

OTHER PUBLICATIONS

"Office Action of China Counterpart Application", issued on Dec. 28, 2023, with English translation thereof, p. 1-p. 16.

\* cited by examiner

STRAIN DISTRIBUTION MEASUREMENT SYSTEM AND STRAIN DISTRIBUTION MEASUREMENT METHOD THAT MEASURE STRAIN DISTRIBUTION BASED ON DISTRIBUTION OF REFLECTANCE OR POLARIZATION CHARACTERISTIC

INCORPORATION BY REFERENCE

The present application claims priority under 35 U.S.C. § 119 to Japanese Patent Application No. 2020-089381 filed on May 22, 2020. The content of the application is incorporated herein by reference in its entirety.

BACKGROUND

Technical Field

The present invention relates to a strain distribution measurement system for a test piece deformed by a material tester, and a strain distribution measurement method.

Related Art

Various techniques for measuring displacement of a surface of a test piece deformed by a material tester are known.

For example, JP 2011-174874 A discloses a technology of a displacement measuring device including a capturing unit that captures a displacement measurement image with a displacement measurement grid provided at a predetermined position, a grid region detection unit that detects a grid region from the displacement measurement image and extracts an image in the grid region, a phase distribution deriving unit that derives a moiré phase distribution with respect to the image in the grid region by applying the sampling moire method to the extracted image in the grid region, and a displacement determination unit that determines displacement at a predetermined position based on a phase difference before and after the displacement at the predetermined position obtained from the phase distribution and a predetermined grid pitch.

SUMMARY

However, in the displacement measuring device described in JP 2011-174874 A, it is necessary to form a grid pattern or the like, for displacement measurement, on a surface of a test piece. For example, when measuring a displacement distribution of a test piece of a tensile tester, the user needs to apply or attach a pattern such as a grid pattern to the surface of the test piece, which is time-consuming for the user.

The present invention has been made in view of such circumstances, and it is an object of the present invention to provide a strain distribution measurement system and a strain distribution measurement method capable of reducing the user's labor for measuring a strain distribution of a test piece of a material tester.

A first aspect of the present invention is a strain distribution measurement system including a material tester that deforms a test piece to measure mechanical properties of a material of the test piece, and a strain distribution measuring device that measures a strain distribution of the test piece, in which the strain distribution measuring device includes a control unit that measures the strain distribution of the test piece based on the distribution of at least a reflectance or a polarization characteristic on the main face of the test piece.

A second aspect of the present invention is a strain distribution measurement method for the strain distribution measurement system including the material tester that deforms the test piece to measure the mechanical properties of the material of the test piece, and the strain distribution measuring device that measures the strain distribution of the test piece, the method including measuring, by the strain distribution measuring device, the strain distribution of the test piece based on the distribution of at least one of the reflectance or the polarization characteristic on the main face of the test piece.

According to the first aspect of the present invention, the strain distribution of the test piece is measured based on the distribution of at least one of the reflectance or the polarization characteristic on the main face of the test piece.

Since the strain distribution of the test piece is measured based on the distribution of at least one of the reflectance or the polarization characteristic on the main face of the test piece, it is possible to measure the strain distribution of the test piece without applying or attaching a grid-like pattern to the test piece. Therefore, the user's labor for applying or attaching the grid-like pattern to the test piece can be eliminated. As a result, it is possible to reduce the user's labor for measuring the strain distribution of the test piece of the material tester.

According to the second aspect of the present invention, the strain distribution of the test piece is measured based on the distribution of at least one of the reflectance or the polarization characteristic on the main face of the test piece.

Since the strain distribution of the test piece is measured based on the distribution of at least one of the reflectance or the polarization characteristic on the main face of the test piece, it is possible to measure the strain distribution of the test piece without applying or attaching a grid-like pattern to the test piece. Therefore, the user's labor for applying or attaching the grid-like pattern to the test piece can be eliminated. As a result, it is possible to reduce the user's labor for measuring the strain distribution of the test piece of the material tester.

DETAILED DESCRIPTION

Hereinafter, embodiments of the present invention will be described with reference to the drawings.

1. Tensile Tester Configuration

Figure 1:
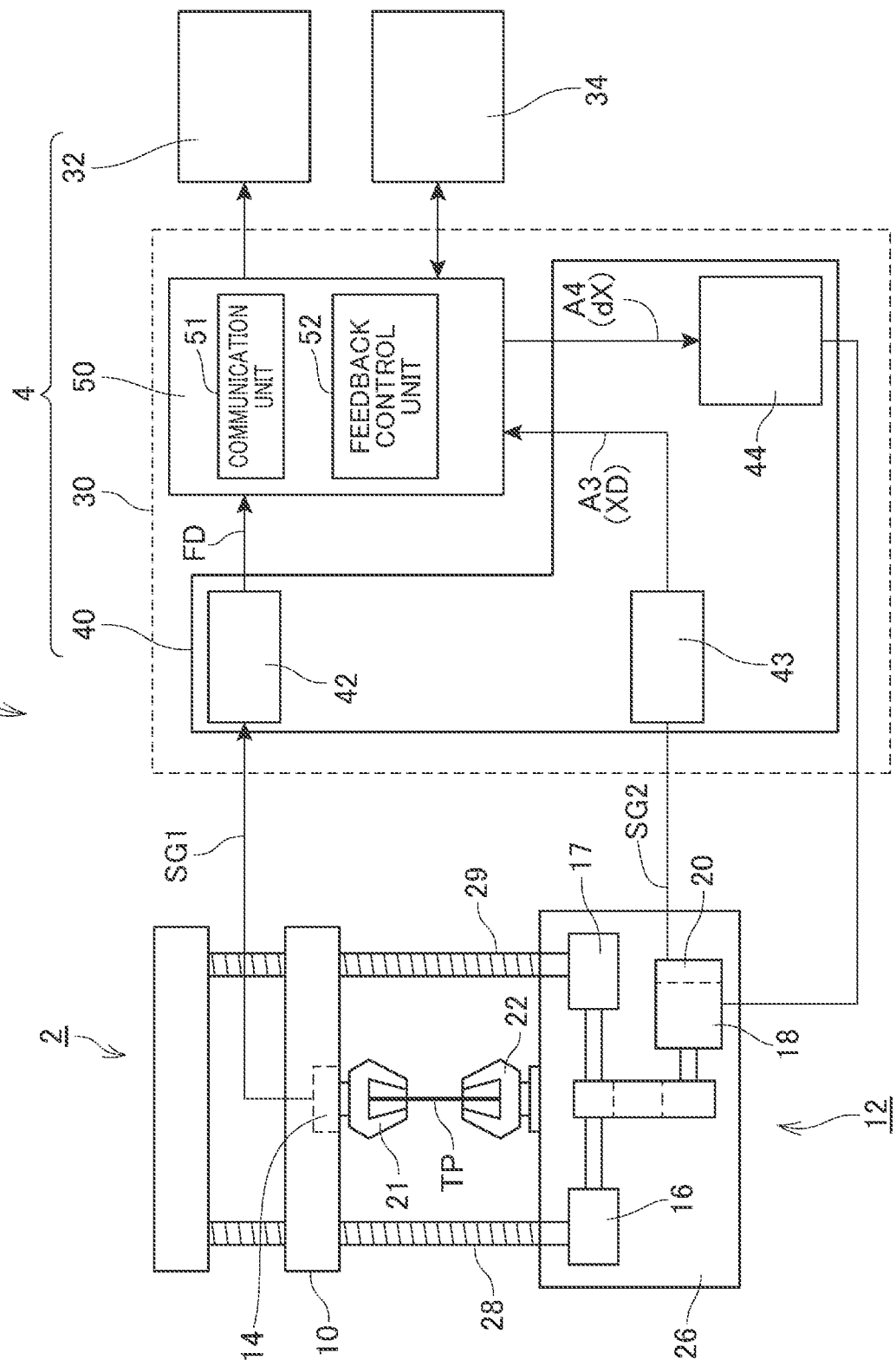
FIG. 1 is a diagram showing an example of a configuration of a tensile tester according to embodiments of the present invention.

FIG. 1 is a diagram showing an example of a configuration of a tensile tester 1 according to embodiments of the present invention.

The tensile tester 1 according to the embodiments of the present invention applies a test force F to a test piece TP to perform a material test for measuring mechanical properties such as a tensile strength and a yield point of a sample. The test force F is a tensile force.

The tensile tester 1 includes a tensile tester main body 2 that applies the test force F to the test piece TP, which is a material to be tested, to perform a tensile test, and a control unit 4 that controls a tensile test operation by the tensile tester main body 2.

The tensile tester 1 corresponds to an example of a "material tester".

The embodiments of the present invention include a first embodiment described later with reference to FIGS. 2 to 6 and a second embodiment described with reference to FIG. 7.

The tester main body 2 includes a table 26, a pair of screw rods 28 and 29 rotatably erected on the table 26 in a vertical direction, a cross head 10 that can move along these screw rods 28 and 29, a load mechanism 12 that moves the cross head 10 to apply a load to the test piece TP, and a load cell 14. The load cell 14 is a sensor that measures the test force F, which is a tensile load applied to the test piece TP, and outputs a test force measurement signal SG1.

The load mechanism 12 includes worm reducers 16 and 17 connected to lower ends of the screw rods 28 and 29, a servomotor 18 connected to the worm reducers 16 and 17, and a rotary encoder 20. The rotary encoder 20 is a sensor that measures a rotation amount of the servomotor 18 and outputs to the control unit 4 a rotation measurement signal SG2 of the number of pulses corresponding to the rotation amount.

The load mechanism 12 transmits the rotation of the servomotor 18 to the pair of screw rods 28 and 29 via the worm reducers 16 and 17, and the screw rods 28 and 29 rotate synchronously so that the cross head 10 moves up and down along the screw rods 28 and 29.

The cross head 10 is provided with an upper gripping tool 21 for gripping an upper end of the test piece TP, and the table 26 is provided with a lower gripping tool 22 for gripping a lower end of the test piece TP. When performing the tensile test, the tester main body 2 gives the test force F to the test piece TP by lifting the cross head 10, according to the control by the control unit 4, with the upper gripping tool 21 and the lower gripping tool 22 gripping both ends of the test piece TP.

The test piece TP is composed of plain-woven or twill-woven Fiber Reinforced Plastics (FRP) that include Carbon Fiber Reinforced Plastic (CFRP) and Glass Fiber Reinforced Plastics (GFRP).

In the embodiments of the present invention, the test piece TP is composed of a plain-woven CFRP. The test piece TP has a warp VT and a weft HT.

The warp VT and the weft HT will be described later in detail with reference to FIG. 3.

In the embodiments of the present invention, the test piece TP is composed of the plain-woven CFRP, but the embodiments of the present invention are not limited to this, as long as the test piece TP is composed of a plain-woven or twill-woven FRP. For example, the test piece TP may be configured with a twill-woven CFRP. Further, for example, the test piece TP may be configured with a plain-woven GFRP.

The control unit 4 includes an integrated control device 30, a display device 32 (display), and a test program execution device 34.

The integrated control device 30 is a device that centrally controls the tester main body 2, and is connected to the tester main body 2 so as to be able to transmit and receive signals. Signals received from the tester main body 2 are a test force measurement signal SG1 output from the load cell 14, a rotation measurement signal SG2 output from the rotary encoder 20, and an appropriate signal required for control and testing.

The display device 32 is a device that displays various pieces of information based on a signal input from the integrated control device 30. For example, the integrated control device 30 displays on the display device 32 during the tensile test, based on the rotation measurement signal SG2, a displacement measurement value XD indicating displacement of the cross head 10.

The tensile test program execution device 34 is equipped with a function to accept user operations such as setting operations of various setting parameters, including tensile test conditions and execution instruction operations, and output the user operations to the integrated control device 30, and a function to analyze data of a test force measurement value FD.

The tensile test program execution device 34 according to the embodiments of the present invention includes a computer, and this computer is equipped with a processor such as a Central Processing Unit (CPU) and a Micro-Processing Unit (MPU), a memory device such as a Read Only Memory (ROM) and a Random Access Memory (RAM), a storage device such as a Hard Disk Drive (HDD) and Solid State Drive (SSD), and an interface circuit for connecting the integrated control device 30 and various peripheral devices. The processor executes the tensile test program, which is a computer program stored in the memory device or the storage device, to realize the above-mentioned various functions.

Next, the integrated control device 30 according to the embodiments of the present invention will be described in more detail. The integrated control device 30 includes a signal input/output unit 40 and a control circuit unit 50.

The signal input/output unit 40 configures an input/output interface circuit that transmits and receives signals to and from the tester main body 2. In the embodiments of the present invention, the signal input/output unit 40 includes a first sensor amplifier 42, a second sensor amplifier 45, a counter circuit 43, and a servo amplifier 44.

The first sensor amplifier 42 is an amplifier that amplifies and outputs the test force measurement signal SG1 output from the load cell 14 to the control circuit unit 50.

The counter circuit 43 counts the number of pulses of the rotation measurement signal SG2 output by the rotary encoder 20, and outputs to the control circuit unit 50, as a digital signal, a displacement measurement signal A3 indicating an amount of rotation of the servomotor 18, i.e., the displacement measurement value XD of the cross head 10 that moves up and down by the rotation of the servomotor 18. The servo amplifier 44 is a device that controls the servomotor 18 according to the control by the control circuit unit 50.

The control circuit unit 50 includes a communication unit 51 and a feedback control unit 52.

The control circuit unit 50 includes a processor such as a CPU and MPU, a memory device such as ROM and RAM, a storage device such as HDD and SSD, an interface circuit with the signal input/output unit 40, a communication device that communicates with the tensile test program execution device 34, a display control circuit that controls the display device 32, and various electronic circuits. Further, the processor of the control circuit unit 50 executes a control program stored in the memory device or the storage device to realize each functional unit shown in FIG. 1.

Further, an A/D converter is provided in the interface circuit of the signal input/output unit 40, and the test force measurement signal SG1 of an analog signal is converted into a digital signal by an A/D converter.

The control circuit unit 50 is not limited to the computer, and may be configured by one or a plurality of appropriate circuits such as an integrated circuit of, for example, an IC chip and LSI.

The communication unit 51 communicates with the test program execution device 34, and receives test condition settings, set values of various setting parameters, a tensile test execution instruction or interruption instruction, and the like from the test program execution device 34. Further, the communication unit 51 transmits the test force measurement value FD, based on the test force measurement signal SG1, to the test program execution device 34 at an appropriate timing. Further, the communication unit 51 transmits the displacement measurement value XD, based on the rotation measurement signal SG2, to the test program execution device 34 at an appropriate timing.

The feedback control unit 52 performs a feedback control of the servomotor 18 of the tester main body 2 to execute the tensile test. The feedback control unit 52 is a circuit that executes the feedback control of the servomotor 18.

When the feedback control unit 52 executes a position control, the feedback control unit 52 executes the position control of, for example, the test force measurement value FD output by the load cell 14. In this case, the feedback control unit 52 calculates a command value dX of the displacement measurement value XD so that the test force measurement value FD matches a test force target value FT, and outputs a command signal A4 indicating the command value dX to the servo amplifier 44. The test force target value FT indicates a target value of the test force measurement value FD.

Note that the "position control" means to control a detected value measured by a sensor or the like so as to match the target value.

In the embodiments of the present invention, the case where the feedback control unit 52 executes the position control will be described, but the feedback control unit 52 may also execute a speed control. The "speed control" means to control an amount of change per unit time of the detected value measured by a sensor or the like so as to match the target value.

Figure 2:
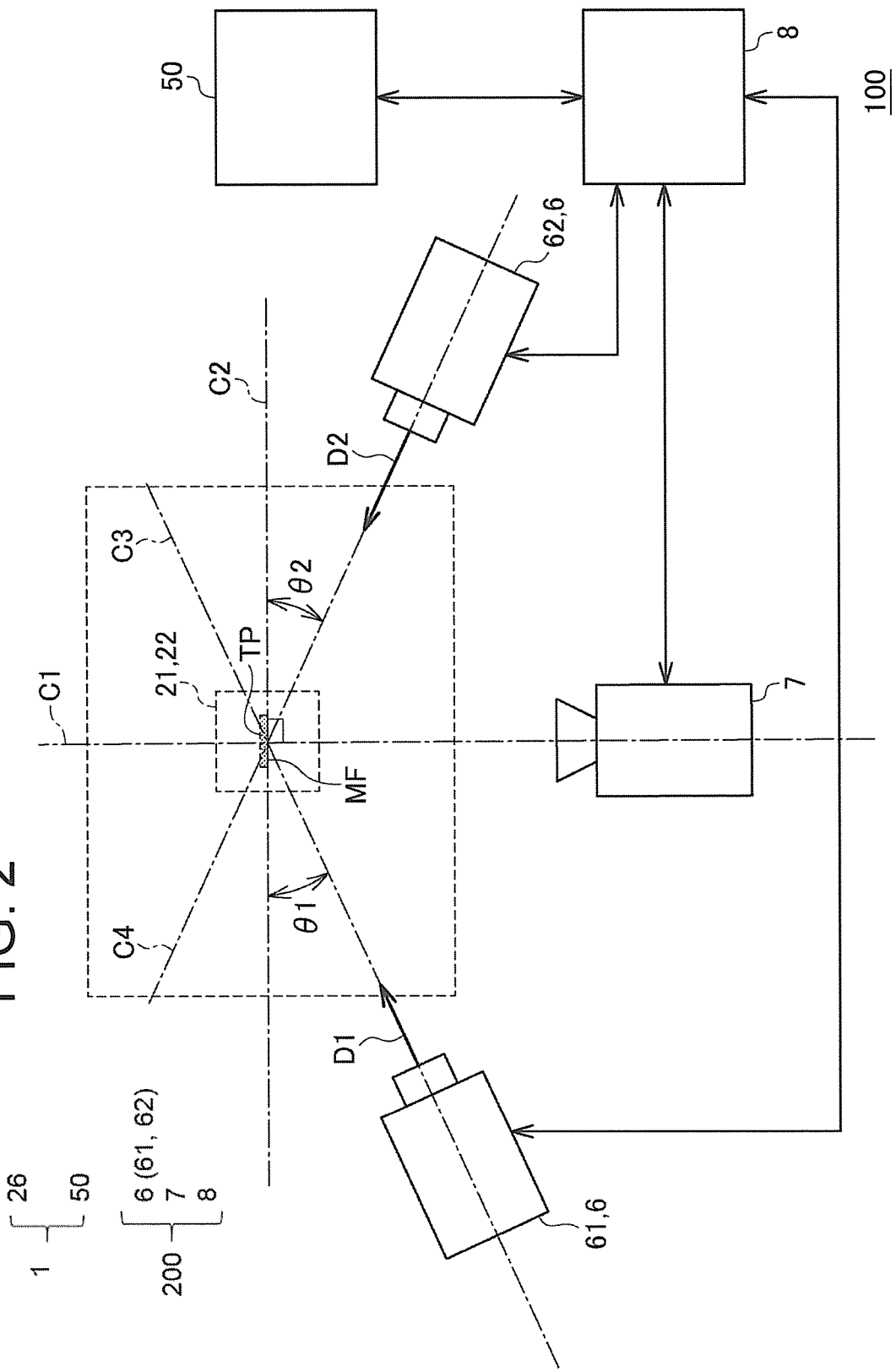
FIG. 2 is a plan view showing an example of a configuration of a strain distribution measurement system according to a first embodiment of the present invention.

2. First Embodiment 2-1. Configuration of Strain Distribution Measurement System in First Embodiment FIG. 2 is a plan view showing an example of the configuration of a strain distribution measurement system 100 according to the first embodiment of the present invention. As shown in FIG. 2, the strain distribution measurement system 100 includes the tensile tester 1 described with reference to FIG. 1 and a strain distribution measuring device 200. The strain distribution measuring device 200 includes a light source unit 6, a camera 7, and a control unit 8.

The upper gripping tool 21 and the lower gripping tool 22 of the tensile tester 1 grip the test piece TP.

The test piece TP has a main face MF. The main face MF indicates a main face of the test piece TP on the side close to the camera 7. The side of the test piece TP close to the camera 7 is a downside of FIG. 2.

The camera 7 generates a captured image PN of the main face MF of the test piece TP according to an instruction of the control unit 8. The camera 7 includes an image sensor such as a Charge Coupled Device (CCD) and a Complementary MOS (CMOS).

The camera 7 corresponds to an example of an "imaging unit". The captured image PN will be described later with reference to FIG. 3.

The camera 7 is arranged so that a photographing direction C1 of the camera 7 passes through the center of the test piece TP in a width direction and is orthogonal to the main face MF of the test piece TP. A width direction C2 of the test piece TP indicates the left-right direction in FIG. 2. The photographing direction C1 indicates the center of a shooting range of the camera 7.

The light source unit 6 irradiates the main face MF of the test piece TP with light. The light source unit 6 includes a first light source 61 and a second light source 62.

The first light source 61 irradiates the main face MF of the test piece TP with light from a first direction D1. The first direction D1 corresponds to a first irradiation direction C3. A narrow angle between a straight line indicating the first irradiation direction C3 and a straight line indicating the width direction C2 is a first angle $\theta 1$. The first angle $\theta 1$ is, for example, 25 degrees. The first angle $\theta 1$ is preferably in a range of 15 degrees to 30 degrees.

The second light source 62 irradiates the main face MF of the test piece TP with light from a second direction D2. The second direction D2 indicates a direction line-symmetrical with the first direction D1 with respect to a straight line indicating the photographing direction C1. The straight line indicating the photographing direction C1 is the normal of the plane including the main face MF of the test piece TP.

The second direction D2 corresponds to a second irradiation direction C4. A narrow angle between a straight line indicating the second irradiation direction C4 and a straight line indicating the width direction C2 is a second angle $\theta 2$. A value of the second angle $\theta 2$ substantially matches a value of the first angle $\theta 1$. In other words, the second angle $\theta 2$ is, for example, 25 degrees. The second angle $\theta 2$ is preferably in a range of 15 degrees to 30 degrees.

Each of the first light source 61 and the second light source 62 is, for example, a light source of white Light Emitting Diode (LED).

In the first embodiment of the present invention, each of the first light source 61 and the second light source 62 is an LED light source, but the embodiments of the present invention are not limited thereto. For example, each of the first light source 61 and the second light source 62 may be a lamp light source such as a halogen lamp or a xenon lamp.

The control unit 8 controls the operation of the strain distribution measuring device 200. Further, the control unit 8 is configured to be communicable with the control circuit unit 50, and controls the operations of the light source unit 6 and the camera 7 according to an instruction from the control circuit unit 50. Specifically, the control unit 8 determines a light emission timing of the light source unit 6 and a shooting timing of the camera 7 according to the instruction from the control circuit unit 50. The configuration of the control unit 8 will be described in detail later with reference to FIG. 4.

In the strain distribution measurement system 100 according to the first embodiment, the first light source 61 and the second light source 62 are arranged apart from the test piece TP in the width direction C2, but the embodiments of the present invention are not limited thereto as long as the first light source 61 and the second light source 62 are arranged apart from the test piece TP in one direction. For example, the first light source 61 and the second light source 62 may be arranged apart from the test piece TP in a longitudinal direction of the test piece TP. The longitudinal direction of the test piece TP indicates a direction vertical to a paper surface of FIG. 2

2-2. Specific Example of Captured Image

Figure 3:
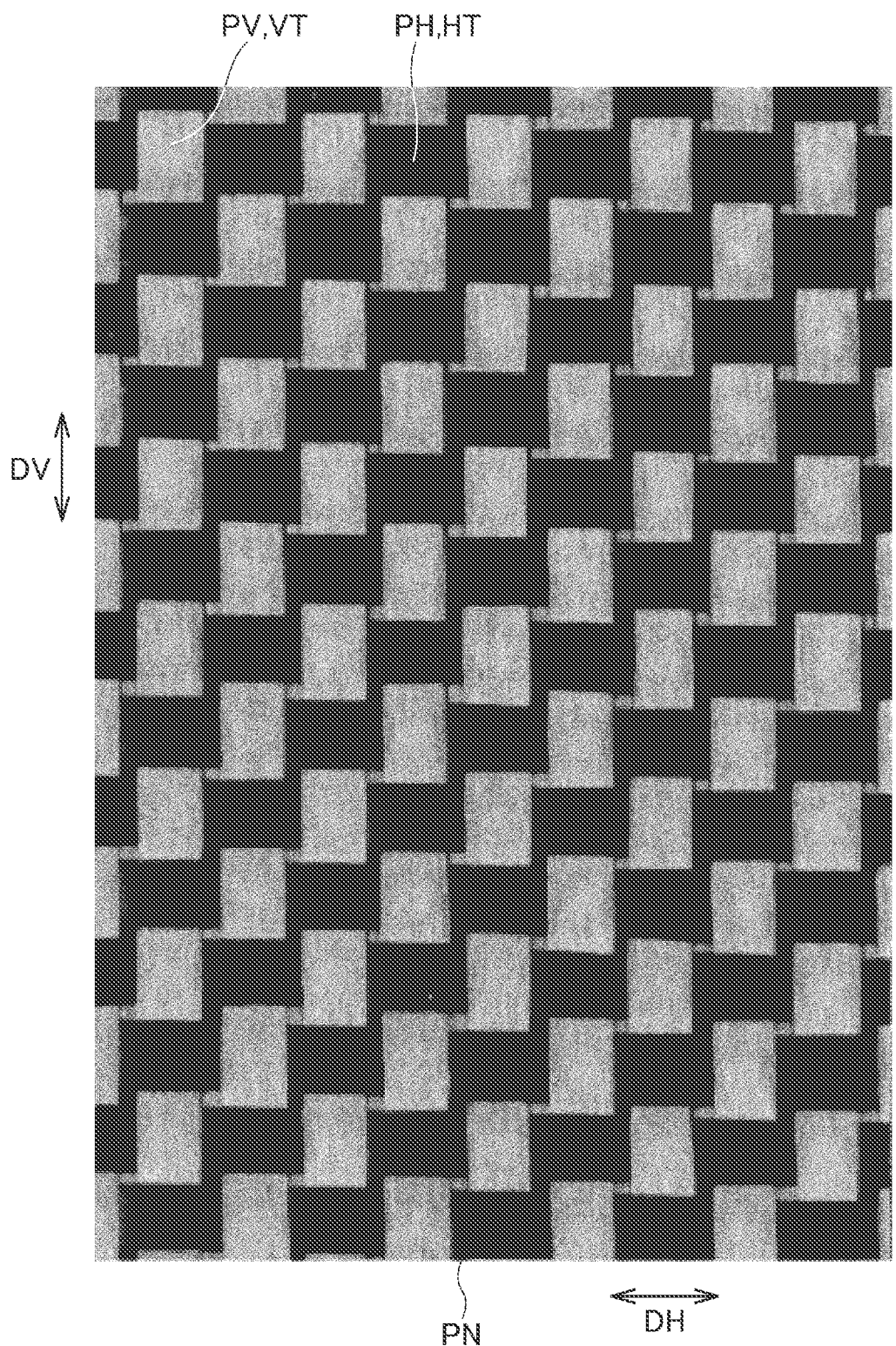
FIG. 3 is an example of a captured image according to the first embodiment of the present invention.

FIG. 3 is an example of the captured image PN according to the first embodiment of the present invention.

The captured image PN is configured with a bright region PV and a dark region PH arranged in a checkered pattern.

The bright region PV is a region in which an amount of reflected light entering the camera 7 among pieces of reflected light of light rays from the first light source 61 and light rays from the second light source 62 is larger than that in the dark region PH. The bright region PV corresponds to the warp VT.

The dark region PH shows a region in which an amount of reflected light entering the camera 7 among pieces of reflected light of light rays from the first light source 61 and light rays from the second light source 62 is smaller than that in the bright region PV. The dark region PH corresponds to the weft HT.

Fibers of the warp VT extend in a vertical direction DV. The vertical direction DV matches a vertical direction of the test piece TP. Further, as shown in FIG. 2, the vertical direction of the test piece TP is orthogonal to the first direction D1 and the second direction D2. Therefore, on the surface of the warp VT, the light rays from the first light source 61 and the light rays from the second light source 62 are more likely to be irregularly reflected than on the surface of the weft HT. As a result, a bright region PV corresponding to the warp VT is generated.

On the other hand, fibers of the weft HT extend in the left-right direction DH. The left-right direction DH matches a width direction of the test piece TP. Further, as shown in FIG. 2, the width direction of the test piece TP and the first direction D1 form the first angle θ1, and the width direction of the test piece TP and the second direction D2 form a second angle θ2. Each of the first angle θ1 and the second angle θ2 is 25 degrees. Therefore, on the surface of the weft HT, each of the light rays from the first light source 61 and the light rays from the second light source 62 is more likely to be specularly reflected than on the surface of the warp VT. As a result, the dark region PH corresponding to the weft HT is generated.

2-3. Configuration of Control Unit

Figure 4:
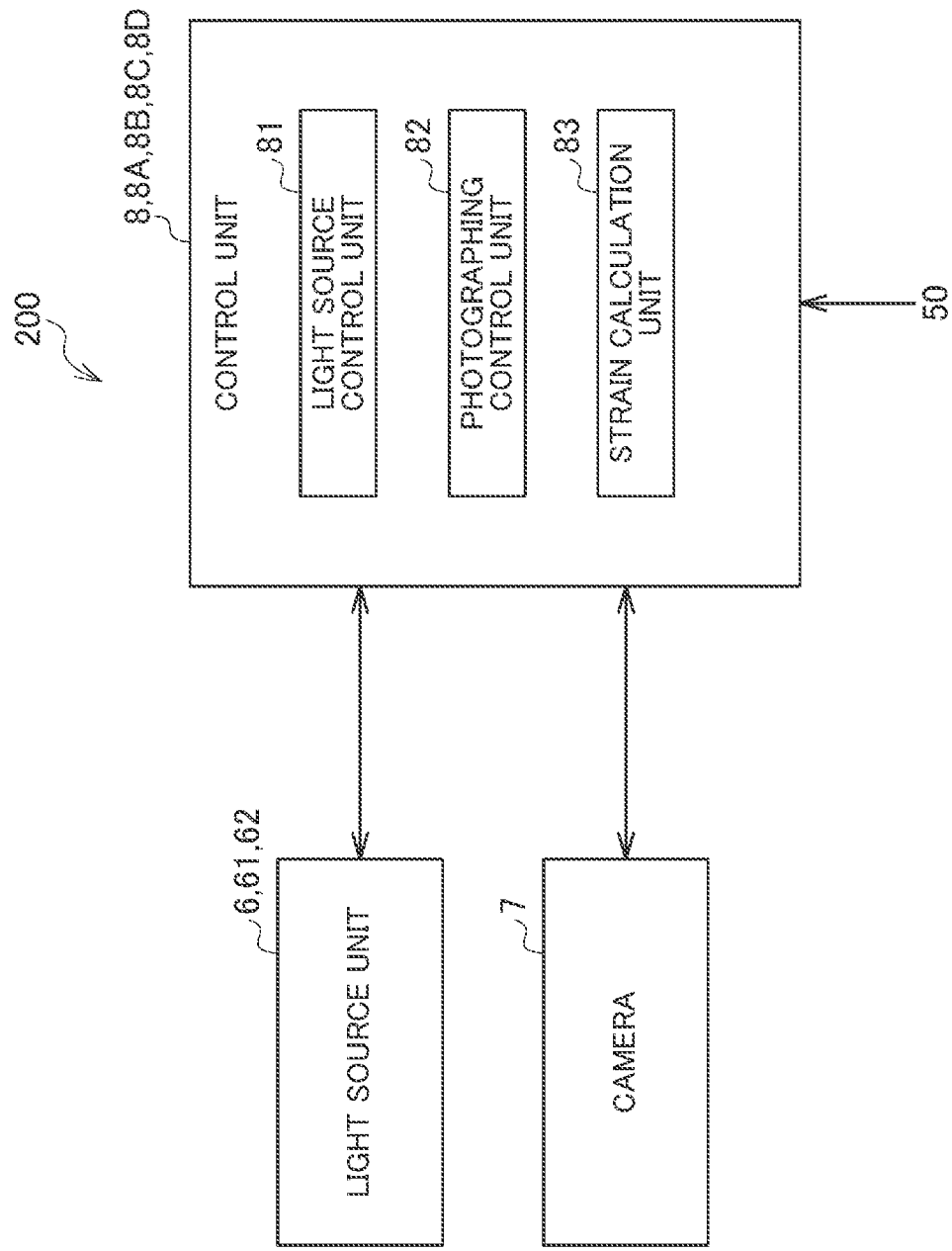
FIG. 4 is an example of a configuration of a control unit according to the first embodiment of the present invention.

FIG. 4 is an example of a configuration of the control unit 8 according to the first embodiment of the present invention.

As shown in FIG. 4, the control unit 8 includes a light source control unit 81, a photographing control unit 82, and a strain calculation unit 83.

Further, the control unit 8 is configured with a personal computer equipped with a processor 8A such as a CPU and an MPU, a memory device 8B such as a ROM and a RAM, a storage device 8C such as an HDD and an SSD, a communication device 8D that communicates with each part of the control circuit units 50, and various electronic circuits.

Further, the processor 8A of the control unit 8 executes a control program stored in the memory device 8B or the storage device 8C to realize each functional unit shown in FIG. 4.

The control unit 8 is not limited to the personal computer, and may be configured by one or a plurality of appropriate circuits such as an integrated circuit of, for example, an IC chip and LSI. Further, the control unit 8 may be equipped with, for example, a tablet terminal or a smartphone.

Further, the control unit 8 may include programmed hardware such as a Digital Signal Processor (DSP) and a Field Programmable Gate Array (FPGA). Further, the control unit 8 may be equipped with a System-on-a-Chip (SoC)-FPGA.

The light source control unit 81 controls the light source unit 6 so that the light source unit 6 irradiates the main face MF of the test piece TP with light. Specifically, the light source control unit 81 controls the light source unit 6 according to an instruction from the control circuit unit 50.

Further, the light source control unit 81 controls the light source unit 6 so that the light source unit 6 irradiates the main face MF of the test piece TP with light at a timing when the photographing control unit 82 generates the captured image PN.

The photographing control unit 82 causes the camera 7 to capture the main face MF of the test piece TP to generate the captured image PN. Specifically, the photographing control unit 82 generates the captured image PN according to the instruction from the control circuit unit 50.

Further, the photographing control unit 82 generates the captured image PN at predetermined time intervals. The predetermined time is, for example, 0.01 seconds. Specifically, from the start of executing the tensile test by the tensile tester 1 to the end of executing the tensile test, the photographing control unit 82 generates the captured image PN at the predetermined time intervals.

The strain calculation unit 83 calculates a strain distribution of the test piece TP based on the captured image PN. Specifically, the strain calculation unit 83 calculates the strain distribution of the test piece TP as follows.

Figure 5:
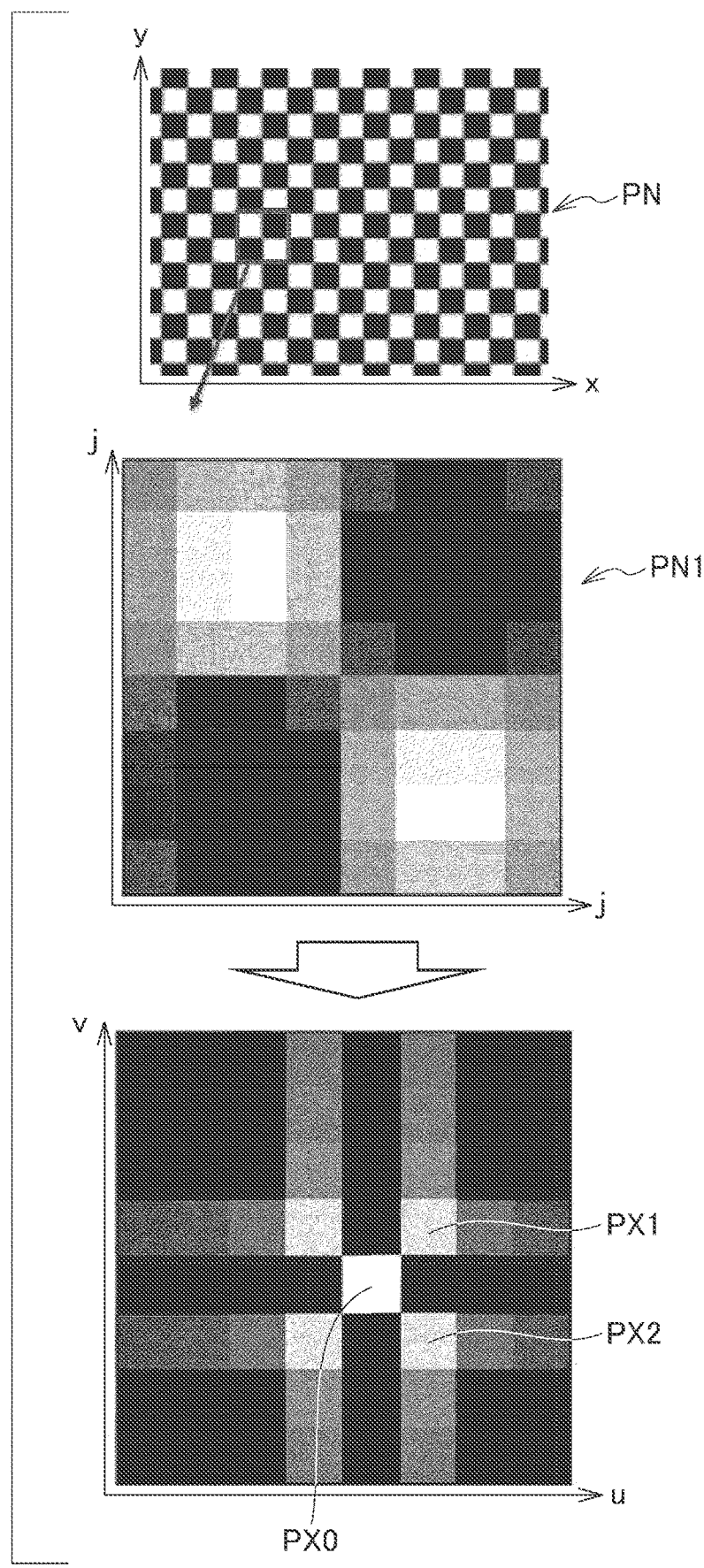
FIG. 5 is a diagram showing an example of a process by a strain calculation unit according to the first embodiment of the present invention.

FIG. 5 is a diagram showing an example of a process by the strain calculation unit 83 according to the first embodiment of the present invention. As shown in an upper figure of FIG. 5, the captured image PN in the following description is assumed to be a checkered pattern.

As shown in the upper figure of FIG. 5, centering on pixels (x, y) of the captured image PN, pixels corresponding to one period of the checkered pattern are extracted for Nx in the x-axis direction and Ny in the y-axis direction. The horizontal axis is the x axis, and the vertical axis is the y axis in the upper figure of FIG. 5. And, a luminance value I (x, y) for one period of the checkered pattern is Function f (x, y, i, j).

Function f (x, y, i, j) is given by the following Equation 1.

[Equation 1]

$$f(x, y, i, j) = I\left(x + i - \frac{N_x}{2}, y + j - \frac{N_y}{2}\right), \quad (1)$$
$$(i = 0, 1, 2, \ldots, N_x), (j = 0, 1, 2, \ldots, N_y)$$

Here, the x-axis direction corresponds to the width direction of the test piece TP, and the y-axis direction corresponds to the vertical direction of the test piece TP.

The middle figure of FIG. 5 shows Function f (x, y, i j). The horizontal axis is the number of pixels i in the x-axis direction, and the vertical axis is the number of pixels j in the y-axis direction in the middle figure of FIG. 5.

When two-dimensional Discrete Fourier Transformation (DFT) is performed on Function f (x, y, i, j) shown in Equation 1, a distribution of spatial frequency components can be obtained as shown in the lower figure of FIG. 5. The horizontal axis is a frequency u in the x-axis direction and the vertical axis is a frequency v in the y-axis direction in the lower figure of FIG. 5.

When the captured image PN has the checkered pattern, as shown in the lower figure of FIG. 5, two regions PX1 and PX2 indicating fundamental frequency components appear in a diagonal direction with respect to a region PX0 as a high-intensity component other than a region PX0 corresponding to a DC component.

The components obtained by DFT are usually complex numbers, but when expressed in real numbers for easy understanding, the following Equations 2 and 3 are obtained.

[Equation 2]

$$f_1(x, y, i, j) = \cos\left(\left(2\pi\frac{i}{P_x} + \varphi_x(x, y)\right) + \left(2\pi\frac{j}{P_y} + \varphi_y(x, y)\right)\right), \quad (2)$$

[Equation 3]

$$f_2(x, y, i, j) = \cos\left(\left(2\pi\frac{i}{P_x} + \varphi_x(x, y)\right) - \left(2\pi\frac{j}{P_y} + \varphi_y(x, y)\right)\right), \quad (3)$$

Function $f_1$ (x, y, i, j) in Equation 2 corresponds to the region PX1, shown in the lower figure of FIG. 5, indicating the fundamental frequency component, and Function $f_2$ (x, y, i, j) in Equation 3 corresponds to the region PX2, shown in the lower figure of FIG. 5, indicating the fundamental frequency component. Here, phases of Function $f_1$ (x, y, i, j) and Function $f_2$ (x, y, i, j) are divided into the x-axis direction and the y-axis direction to obtain Function $\varphi_x$ (x, y), and Function $\varphi_y$ (x, y). Each of period Px and period Py represents a pattern period (integer) in pixel units in the x-axis direction and the y-axis direction. The phases of Function $f_1$ (x, y, i, j) and Function $f_2$ (x, y, i, j) are obtained by the following Equations 4 and 5.

[Equation 4]

$$\varphi_x(x, y) + \varphi_y(x, y) = \quad (4)$$

$$-\tan^{-1}\left[\frac{\sum_{i=0}^{Nx-1}\sum_{j=0}^{Ny-1} f(x, y, i, j)\sin\left(\frac{2\pi i}{P_x} + \frac{2\pi j}{P_y}\right)}{\sum_{i=0}^{Nx-1}\sum_{j=0}^{Ny-1} f(x, y, i, j)\cos\left(\frac{2\pi i}{P_x} + \frac{2\pi j}{P_y}\right)}\right],$$

[Equation 5]

$$\varphi_x(x, y) - \varphi_y(x, y) = \quad (5)$$

$$-\tan^{-1}\left[\frac{\sum_{i=0}^{Nx-1}\sum_{j=0}^{Ny-1} f(x, y, i, j)\sin\left(\frac{2\pi i}{P_x} - \frac{2\pi j}{P_y}\right)}{\sum_{i=0}^{Nx-1}\sum_{j=0}^{Ny-1} f(x, y, i, j)\cos\left(\frac{2\pi i}{P_x} - \frac{2\pi j}{P_y}\right)}\right],$$

The DFT assumes that both ends of an image PN1 to be processed are continuous, but due to a relationship of a distance between the camera 7 and the main face MF of the test piece TP and a strain of the test piece TP that occurs during the test, both ends of the image PN1 will be discontinuous when there is deviation between the period of a captured pattern and the period of extracted pixels.

Therefore, the influence of discontinuity is reduced by using the window function. The Gaussian function shown in the following Equation 6 is used as the window function to also extract peripheral pixels of each pixel wider than one period.

[Equation 6]

$$g(i, j) = \exp\left(-\frac{i^2}{2\sigma_x^2} - \frac{j^2}{2\sigma_y^2}\right), \quad (6)$$

In the first embodiment, σx and σy in Equation 6 are defined by the following Equation 7, and peripheral pixels for three periods are extracted.

$$\sigma x = Px/2, \sigma y = Py/2 \quad (7)$$

When Equation 6 is combined with Equations 4 and 5, phases of all pixels can be collectively calculated at high speed by convolution calculation as shown in the following Equations 8 to 10.

[Equation 7]

$$k_1^s(i, j) = g(i, j)\sin\left(\frac{2\pi i}{P_x} + \frac{2\pi j}{P_y}\right), k_1^c(i, j) = g(i, j)\cos\left(\frac{2\pi i}{P_x} + \frac{2\pi j}{P_j}\right), \quad (8)$$

[Equation 8]

$$k_2^s(i, j) = g(i, j)\sin\left(\frac{2\pi i}{P_x} - \frac{2\pi j}{P_y}\right), k_2^c(i, j) = g(i, j)\cos\left(\frac{2\pi i}{P_x} - \frac{2\pi j}{P_y}\right), \quad (9)$$

[Equation 9]

$$\varphi_x(x, y) + \varphi_y(x, y) = -\tan^{-1}\left[\frac{(I * k_1^s)(x, y)}{(I * k_1^c)(x, y)}\right] = a_1, \quad (10)$$

[Equation 10]

$$\varphi_x(x, y) - \varphi_y(x, y) = -\tan^{-1}\left[\frac{(I * k_2^s)(x, y)}{(I * k_2^c)(x, y)}\right] = a_2, \quad (11)$$

Function $\varphi_x$ (x, y) and Function $\varphi_y$ (x, y) are obtained by the following Equations 12 and 13, respectively.

[Equation 11]

$$\varphi_x(x, y) = \frac{a_1 + a_2}{2}, \quad (12)$$

[Equation 12]

$$\varphi_y(x, y) = \frac{a_1 - a_2}{2}, \quad (13)$$

In this case, each of Function $\varphi_x$ (x, y) and Function $\varphi_y$ (x, y) is obtained as a value between $-\pi$ and $\eta$. In addition, a pattern obtained by Function $\varphi_x$ (x, y) and Function $\varphi_y$ (x, y), a pattern obtained by Function $\varphi_x$ (x, y)+n, and Function $\varphi_y$ (x, y)+n, or a pattern obtained by Function $\varphi_x$ (x, y)-n and Function $\varphi_y$ (x, y)-n are exactly the same, so the phase cannot be uniquely determined.

Therefore, by defining Function $\varphi_x$ (x, y) and Function $\varphi_y$ (x, y) as shown in the following Equations 14 and 15, each value of Function $\varphi_x(x, y)$ and Function $\varphi_y(x, y)$ is uniquely determined between zero and π.

[Equation 13]
$$\varphi_x(x, y) = \begin{cases} \varphi_x(x, y) & (\varphi_x(x, y) \geq 0) \\ \varphi_x(x, y) + \pi & (\varphi_x(x, y) < 0) \end{cases}, \quad (14)$$

[Equation 14]
$$\varphi_y(x, y) = \begin{cases} \varphi_y(x, y) & (\varphi_y(x, y) \geq 0) \\ \varphi_y(x, y) + \pi & (\varphi_y(x, y) < 0) \end{cases}, \quad (15)$$

After that, in order to compare phase values before and after deformation, when a phase difference with an adjacent pixel is larger than π/2 or smaller than −π/2, a phase unwrapping process to add π or −π is performed. In addition to using a spatial difference, the phase unwrapping process can also use a temporal difference.

The phase before the deformation is Function $\varphi_x^b(x, y)$ and Function $\varphi_y^b(x, y)$, and the phase after the deformation is Function $\varphi_x^a(x, y)$ and Function $\varphi_y^a(x, y)$. Assuming that a pattern period in a real scale is the period $P_x$ in the x-axis direction and the period $P_y$ in the y-axis direction, displacement $u_x$ in the x-axis direction and displacement $u_y$ in the y-axis direction can be obtained by the following Equations 16 and 17.

[Equation 15]
$$u_x(x, y) = \frac{P_x'}{2\pi}(\varphi_x^a(x, y) - \varphi_x^b(x, y)), \quad (16)$$

[Equation 16]
$$u_y(x, y) = \frac{P_y'}{2\pi}(\varphi_y^a(x, y) - \varphi_y^b(x, y)), \quad (17)$$

When the pattern period changes due to strain during the test, the period $P_x$ in the x-axis direction and the period $P_y$ in the y-axis direction of a pattern in pixel units including the number of decimal places in each pixel from a phase gradient is calculated by the following Equations 18 and 19.

[Equation 17]
$$\frac{\partial}{\partial x}\varphi_x(x, y) = \frac{2\pi}{p_x(x, y)}, \quad (18)$$

[Equation 18]
$$\frac{\partial}{\partial y}\varphi_y(x, y) = \frac{2\pi}{p_y(x, y)}, \quad (19)$$

Therefore, a strain $\varepsilon_x$ in the x-axis direction and a strain $\varepsilon_y$ in the y-axis direction can be obtained by the following Equations 20 and 21.

[Equation 19]
$$\varepsilon_x(x, y) = \frac{p_x^a(x, y) - p_x^b(x, y)}{p_x^b(x, y)} = \frac{\frac{\partial}{\partial x}\varphi_x^b(x, y)}{\frac{\partial}{\partial x}\varphi_x^a(x, y)} - 1, \quad (20)$$

[Equation 20]
$$\varepsilon_y(x, y) = \frac{p_y^a(x, y) - p_y^b(x, y)}{p_y^b(x, y)} = \frac{\frac{\partial}{\partial y}\varphi_y^b(x, y)}{\frac{\partial}{\partial y}\varphi_y^a(x, y)} - 1, \quad (21)$$

In this way, the strain calculation unit 83 calculates the strain $\varepsilon_x$ in the x-axis direction and the strain $\varepsilon_y$ in the y-axis direction of the test piece TP.

2-4. Process by Control Unit

Figure 6:
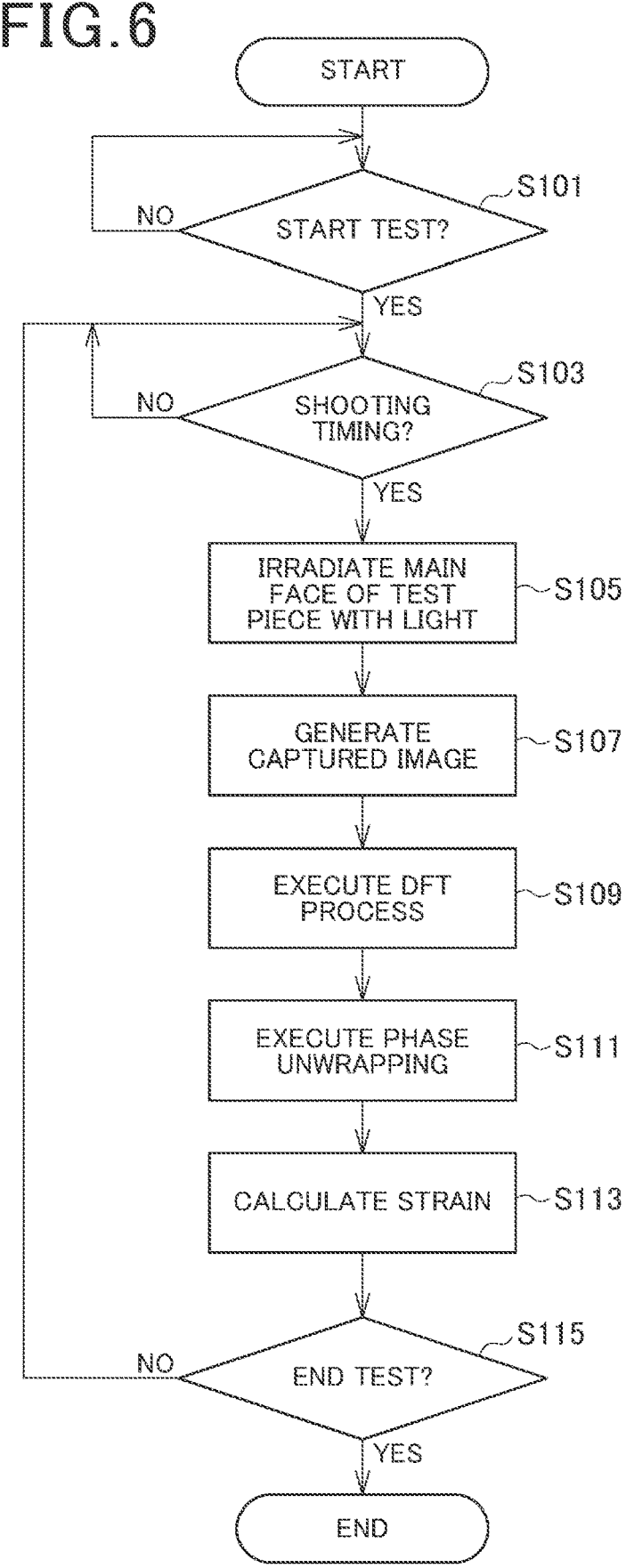
FIG. 6 is a flowchart showing an example of a process by the control unit according to the first embodiment of the present invention.

FIG. 6 is a flowchart showing an example of the process by the control unit 8 according to the first embodiment of the present invention.

First, in step S101, the control unit 8 determines whether or not the tensile tester 1 starts a tensile test. Specifically, the control unit 8 determines whether or not the tensile tester 1 starts the tensile test based on information from the control circuit unit 50.

When the control unit 8 determines that the tensile test will not start (step S101; NO), the process enters into a standby state. When the control unit 8 determines that the tensile test will start (step S101; YES), the process proceeds to step S103.

Next, in step S103, the control unit 8 determines whether or not it is a shooting timing. Specifically, the control unit 8 determines whether or not it is the shooting timing based on an instruction from the control circuit unit 50.

When the control unit 8 determines that it is not the shooting timing (step S103; NO), the process enters into the standby state. When the control unit 8 determines that it is the shooting timing (step S103; YES), the process proceeds to step S105.

Then, in step S105, the light source control unit 81 controls the light source unit 6 so that the light source unit 6 irradiates the main face MF of the test piece TP with light.

Next, in step S107, the photographing control unit 82 causes the camera 7 to capture the main face MF of the test piece TP to generate the captured image PN.

Next, in step S109, the strain calculation unit 83 executes the DFT process on the captured image PN.

Next, in step S111, the strain calculation unit 83 executes the phase unwrapping process.

Next, in step S113, the strain calculation unit 83 calculates the strain $\varepsilon_x$ in the x-axis direction and the strain $\varepsilon_y$ in the y-axis direction.

Next, in step S115, the control unit 8 determines whether or not the tensile tester 1 ends the tensile test. Specifically, the control unit 8 determines whether or not the tensile tester 1 ends the tensile test based on information from the control circuit unit 50.

When the control unit 8 determines that the tensile test will not end (step S115; NO), the process returns to step S103. When the control unit 8 determines that the tensile test will end (step S115; YES), the process ends.

3. Second Embodiment

Figure 7:
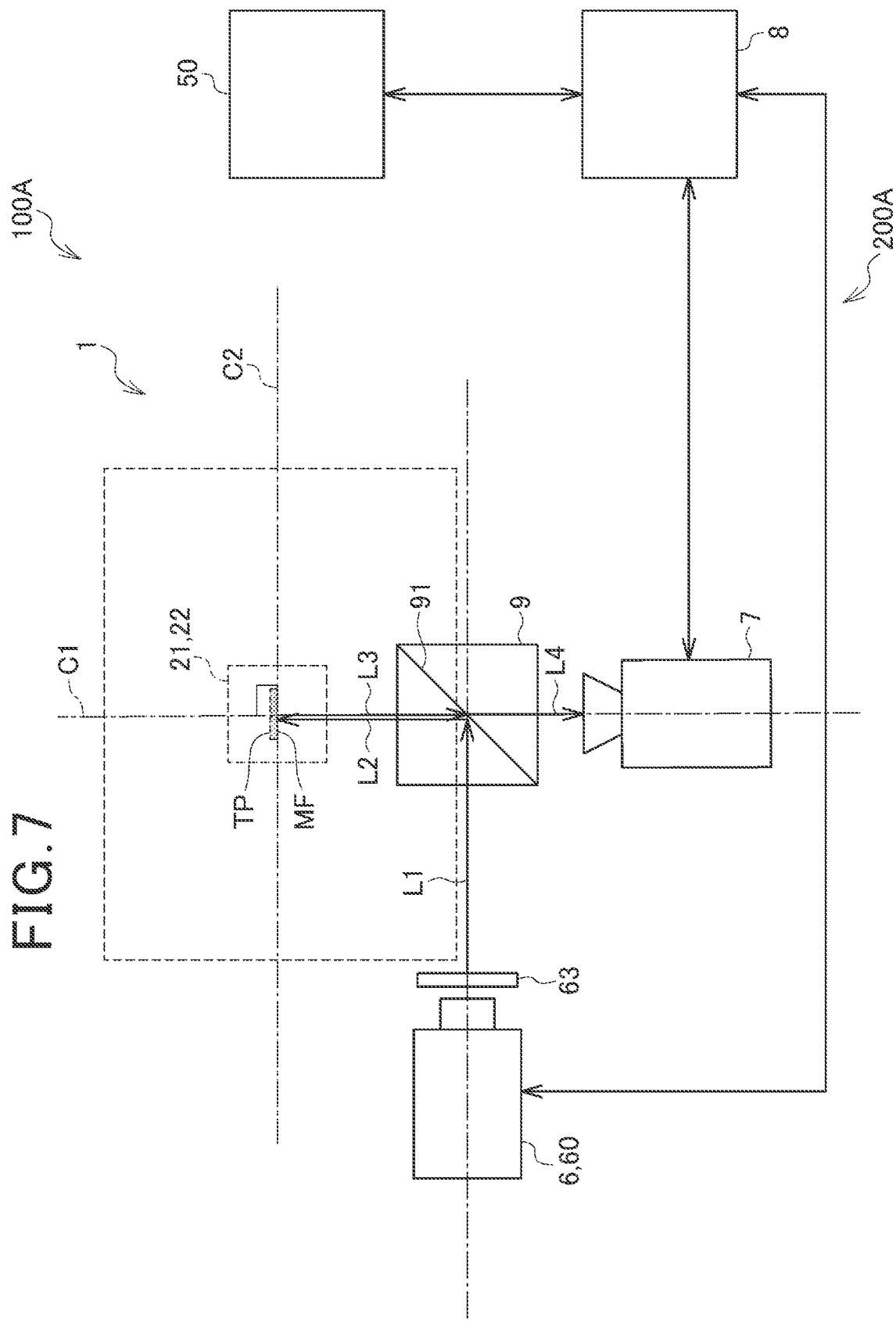
FIG. 7 is a plan view showing an example of a configuration of a strain distribution measurement system according to a second embodiment of the present invention.

FIG. 7 is a plan view showing an example of a configuration of a strain distribution measurement system 100A according to the second embodiment of the present invention. As shown in FIG. 7, the strain distribution measurement system 100A includes the tensile tester 1 and a strain distribution measuring device 200A. The strain distribution measuring device 200A includes a light source unit 6, a camera 7, a control unit 8, and a half mirror 9. The light source unit 6 includes a light source 60 and a polarizing member 63.

The strain distribution measurement system 100A is different from the strain distribution measurement system 100 shown in FIG. 2 in that the light source unit 6 is configured with one light source 60 and the polarizing member 63. Further, the strain distribution measurement system 100A is different in that the half mirror 9 is provided. In the following, differences between the strain distribution measurement system 100A and the strain distribution measurement system 100 shown in FIG. 2 will be described.

The light source 60 irradiates the half mirror 9 with a light ray L1. The light source 60 is, for example, a white LED light source.

The polarizing member 63 is arranged between the light source 60 and the half mirror 9. The polarizing member 63 linearly polarizes the light rays emitted from the light source. The polarizing member 63 is, for example, a birefringent type polarizer.

Specifically, the light source unit 6 irradiates the half mirror 9 with a linearly polarized light generated by the polarizing member 63.

The half mirror 9 is arranged in the photographing direction C1 of the camera 7. The half mirror 9 is arranged between the camera 7 and the test piece TP. Further, the half mirror 9 is arranged at a position parallel to the width direction C2 of the test piece TP with respect to the light source unit 6.

The half mirror 9 includes a reflecting surface 91. The light ray L1 is reflected by the reflecting surface 91, and a reflected light L2 is emitted toward the main face MF of the test piece TP. The reflected light L2 is reflected by the main face MF of the test piece TP, and the reflected light L3 enters the half mirror 9. The reflected light L3 passes through the reflecting surface 91, and a transmitted light L4 enters the camera 7.

A polarization plane of the reflected light L2 is, for example, parallel to a paper surface of FIG. 7. In other words, the polarization plane of the reflected light L2 is parallel to a plane containing the straight line indicating the photographing direction C1 and the straight line indicating the width direction C2.

As described with reference to FIG. 3, the fibers of the warp VT extend in the vertical direction DV, and the fibers of the weft HT extend in the horizontal direction DH. The vertical direction DV matches the vertical direction of the test piece TP, and the horizontal direction DH matches the width direction of the test piece TP. Therefore, the polarization characteristic of the warp VT and the polarization characteristic of the weft HT are different.

Since the polarization plane of the reflected light L2 is parallel to the plane including the straight line indicating the width direction C2, an amount of the reflected light L3 in the warp VT is, for example, larger than an amount of the reflected light L3 in the weft HT.

Therefore, as shown in FIG. 3, the camera 7 captures the captured image PN formed by arranging the bright region PV and the dark region PH in the checkered pattern. The bright region PV corresponds to the warp VT, and the dark region PH corresponds to the weft HT.

In this way, in the strain distribution measurement system 100A according to the second embodiment, the captured image PN of the checkered pattern as shown in FIG. 3 is captured by the camera 7 according to the distribution of the polarization characteristic on the main face MF of the test piece TP. Therefore, the strain calculation unit 83 can calculate the strain distribution of the test piece TP based on the captured image PN.

Further, in the strain distribution measurement system 100A according to the second embodiment, the reflected light L2 is irradiated in a direction orthogonal to the main face MF of the test piece TP. Therefore, the main face MF of the test piece TP can be irradiated with uniform amount of light.

4. Aspects and Effects

It will be understood by those skilled in the art that the first embodiment and the second embodiment described above are specific examples of the following aspects.

Aspect 1

A strain distribution measurement system according to one aspect is a strain distribution measurement system including a material tester that deforms a test piece to measure a mechanical property of a material of the test piece, and a strain distribution measuring device that measures a strain distribution of the test piece, in which the strain distribution measuring device includes a control unit that measures the strain distribution of the test piece based on a distribution of at least one of a reflectance and a polarization characteristic on a main face of the test piece.

According to the strain distribution measurement system in Aspect 1, the strain distribution of the test piece is measured based on the distribution of at least one of the reflectance or the polarization characteristic on the main face of the test piece. Thus, the strain distribution of the test piece can be measured without applying or attaching the grid-like pattern to the test piece on the main face. Therefore, the user's labor for applying or attaching the grid-like pattern to the test piece can be eliminated. As a result, it is possible to reduce the user's labor for measuring the strain distribution of the test piece of the material tester.

Aspect 2

In the strain distribution measurement system according to Aspect 1, the test piece is formed of a plain-woven or twill-woven fiber reinforced plastic (FRP) including carbon fiber reinforced plastic (CFRP) and glass fiber reinforced plastic (GFRP).

According to the strain distribution measurement system in Aspect 2, the test piece is formed of a plain-woven or twill-woven FRP including CFRP and GFRP so that the reflectance and polarization characteristic on the main face of the test piece are distributed in, for example, a checkered pattern. Therefore, the strain distribution of the test piece can be measured accurately.

Aspect 3

In the strain distribution measurement system according to Aspect 2, the test piece is formed of a plain-woven CFRP.

According to the strain distribution measurement system in Aspect 3, since the test piece is formed of the plain-woven CFRP, the reflectance and polarization characteristic on the main face of the test piece are distributed in the checkered pattern. Therefore, the strain distribution of the test piece can be measured accurately.

Aspect 4

In the strain distribution measurement system according to any one of Aspects 1 to 3, the strain distribution measuring device includes a light source unit that irradiates the main face of the test piece with light, and an imaging unit that images the main face of the test piece. The control unit calculates the strain distribution of the test piece based on a captured image by the imaging unit.

According to the strain distribution measurement system in Aspect 4, the light source unit irradiates the main face of the test piece with light, and the imaging unit images the main face of the test piece so that an appropriate captured image can be generated. Further, since the control unit calculates the strain distribution of the test piece based on the appropriate captured image, the strain distribution can be calculated accurately.

Aspect 5

In the strain distribution measurement system according to Aspect 4, the light source unit includes a first light source that irradiates the main face of the test piece with light from a first direction, and a second light source that irradiates the main face of the test piece with light from a second direction line-symmetrical with the first direction with respect to a normal of a plane including the main face.

According to the strain distribution measurement system in Aspect 5, the first light source irradiates the main face of the test piece from the first direction, and the second light source irradiates the main face of the test piece from the second direction line-symmetrical with the first direction with respect to the normal of the plain including the main face. Therefore, the main face of the test piece can be uniformly irradiated.

Further, since the first light source irradiates the main face of the test piece from the first direction and the second light source irradiates the main face of the test piece from the second direction, the strain distribution of the test piece can be measured based on the distribution of the reflectance of the main face of the test piece.

Aspect 6

In the strain distribution measurement system according to Aspect 4, the light source unit includes a light source that irradiates the main face of the test piece with light, and a polarizing member that linearly polarizes a light ray emitted from the light source.

According to the strain distribution measurement system in Aspect 6, a linearly polarized light can be applied to the main face of the test piece. Therefore, the strain distribution of the test piece can be measured based on the distribution of the polarization characteristic on the main face of the test piece.

Aspect 7

In the strain distribution measurement system according to any one of Aspects 4 to 6, the control unit calculates the strain distribution of the test piece by phase analysis, using a two-dimensional discrete Fourier transform (DFT), of the captured image.

According to the strain distribution measurement system in Aspect 7, the control unit calculates the strain distribution of the test piece by the phase analysis of the captured image, using the two-dimensional DFT. Thus, the strain distribution of the test piece can be calculated accurately by a simple process.

Aspect 8

A strain distribution measurement method in one aspect is a strain distribution measurement method for a strain distribution measurement system including a material tester that deforms a test piece to measure a mechanical property of a material of the test piece, and a strain distribution measuring device that measures a strain distribution of the test piece, the method including measuring, by the strain distribution measuring device, the strain distribution of the test piece based on a distribution of at least one of a reflectance and a polarization characteristic on the main face of the test piece.

According to the strain distribution measurement method in Aspect 8, the same effect as that of the strain distribution measurement system described in Aspect 1 is obtained.

5. Other Embodiments

In the embodiments of the present invention, the case where the material tester is the tensile tester 1 has been described, but the embodiments of the present invention are not limited thereto. The material tester may be a compression tester.

Further, in the embodiments of the present invention, the test piece TP is composed of the plain-woven CFRP, but the embodiments of the present invention are not limited, as long as the test piece TP is composed of a plain-woven or twill-woven FRP. For example, the test piece TP may be composed of a plain-woven GFRP, or the test piece TP may be composed of a twill-woven CFRP.

Further, in the embodiments of the present invention, the case where the test piece TP is deformed by the material tester has been described, but the strain distribution and the displacement distribution may be measured based on the state of the checkered pattern before and after the change of the measurement target. For example, when the measurement target is an aircraft or an automobile, the grid pattern before maintenance and the grid pattern during maintenance can be captured by embedding the grid pattern in a molding process of a constituent member or by changing colors of the warp and weft of a glass cloth. The strain distribution and the displacement distribution may be measured by photographing, recording and measuring these grid patterns.

When the grid pattern appears on the surface of the constituent member, the above method may be used. However, when the grid pattern is completely embedded in the constituent member, the grid pattern may be measured using radiation such as X-rays.

Further, in the embodiments of the present invention, the strain of the test target may be analyzed or measured three-dimensionally by providing two or more capturing units.

Further, in the embodiments of the present invention, the case where the control unit 8 functions as the light source control unit 81, the photographing control unit 82, and the strain calculation unit 83 has been described, but the embodiments of the present invention are not limited thereto. The control circuit unit 50 may function as at least one of the light source control unit 81, the photographing control unit 82, and the strain calculation unit 83. For example, the control circuit unit 50 may function as the light source control unit 81, the photographing control unit 82, and the strain calculation unit 83.

Further, at least a part of each functional block shown in FIGS. 1 and 4 may be realized by hardware, or may be a configuration realized by collaboration of hardware and software. It is not limited to the configuration in which independent hardware resources are arranged as shown in the drawings.

Further, the control program executed by the control unit 8 may be stored in another storage unit in the memory. Further, the control program stored in an external device may be acquired and executed via the communication unit or the like.

Further, process units in the flowchart shown in FIG. 6 are divided according to the main process steps in order to make the process in the control unit 8 easy to understand. However, the embodiments are not limited by the method of dividing process units and the name shown in the flowchart in FIG. 6. Further, the process in the control unit 8 can be divided into more process units according to process steps, or can be divided to include more steps in one process unit. Further, the process sequence in the above flowchart is not limited to the illustrated example.

The strain distribution measurement systems 100 and 100A according to the embodiments of the present invention are merely examples of the aspects of the displacement distribution measuring device according to the present invention, and can be arbitrarily modified and applied without departing from the gist of the present invention.

REFERENCE SIGNS LIST 100, 100A STRAIN DISTRIBUTION MEASUREMENT SYSTEM
1 TENSILE TESTER (MATERIAL TESTER)
2 TENSILE TESTER BODY
10 CROSS HEAD
12 LOAD MECHANISM
14 LOAD CELL
15 SERVOMOTOR
20 ROTARY ENCODER
21 UPPER GRIPPING TOOL
22 LOWER GRIPPING TOOL
4 CONTROL UNIT
32 DISPLAY DEVICE
34 TEST PROGRAM EXECUTION DEVICE
30 INTEGRATED CONTROL DEVICE
40 SIGNAL INPUT/OUTPUT UNIT
50 CONTROL CIRCUIT UNIT
200, 200A STRAIN DISTRIBUTION MEASURING DEVICE
6 LIGHT SOURCE UNIT
60, 61, 62 LIGHT SOURCE
63 POLARIZING MEMBER
7 CAMERA
8 CONTROL UNIT
8A PROCESSOR
8B MEMORY DEVICE
8C STORAGE DEVICE
8D COMMUNICATION DEVICE
81 LIGHT SOURCE CONTROL UNIT
82 PHOTOGRAPHING CONTROL UNIT
83 STRAIN CALCULATION UNIT
9 HALF MIRROR
HT WEFT
VT WARP
PN CAPTURED IMAGE
PV BRIGHT REGION
PH DARK REGION
TP TEST TARGET
MF MAIN FACE

What is claimed is:

1. A strain distribution measurement system comprising:
a material tester that deforms a test piece formed of a plain-woven or twill-woven fiber reinforced plastic (FRP) including carbon fibers to measure a mechanical property of a material of the test piece; and
a strain distribution measuring device that measures a strain distribution of the test piece without applying or attaching a grid-like pattern on a main face of the test piece, wherein
the strain distribution measuring device includes a control unit that measures the strain distribution of the test piece based on a distribution of at least one of a reflectance and a polarization characteristic on the main face of the test piece, wherein the control unit performs processing, including a two-dimensional discrete Fourier transform (DFT), on a captured image of the main face of the test piece to measure the strain distribution of the test piece, the captured image being configured with a bright region and a dark region arranged in a checkered pattern, wherein the bright region corresponds to a warp of the test piece, and the dark region corresponds to a weft of the test piece.

2. The strain distribution measurement system according to claim 1, wherein the test piece is formed of a plain-woven or twill-woven fiber reinforced plastic (FRP) including carbon fibers and glass fibers.

3. The strain distribution measurement system according to claim 1, wherein the test piece is formed of a plain-woven CFRP.

4. The strain distribution measurement system according to claim 1, wherein
the strain distribution measuring device includes:
a light source unit that irradiates the main face of the test piece with light, and
an imaging unit that images the main face of the test piece, and
the control unit calculates the strain distribution of the test piece based on the captured image captured by the imaging unit.

5. The strain distribution measurement system according to claim 4, wherein
the light source unit includes:
a first light source that irradiates the main face of the test piece with light from a first direction, and
a second light source that irradiates the main face of the test piece with light from a second direction line-symmetrical with the first direction with respect to a normal of a plane including the main face.

6. The strain distribution measurement system according to claim 4, wherein
the light source unit includes:
a light source that irradiates the main face of the test piece with light, and
a polarizing member that linearly polarizes a light ray emitted from the light source.

7. The strain distribution measurement system according to claim 4, wherein the control unit calculates the strain distribution of the test piece by phase analysis, using the two-dimensional discrete Fourier transform (DFT), of the captured image.

8. A strain distribution measurement method for a strain distribution measurement system including a material tester that deforms a test piece formed of a plain-woven or twill-woven fiber reinforced plastic (FRP) including carbon fibers to measure a mechanical property of a material of the test piece, and a strain distribution measuring device that measures a strain distribution of the test piece, the method comprising:
measuring, by the strain distribution measuring device, the strain distribution of the test piece based on a distribution of at least one of a reflectance and a polarization characteristic on a main face of the test piece without applying or attaching a grid-like pattern on the main face of the test piece,
wherein the strain distribution of the test piece is measured by performing processing, including a two-dimensional discrete Fourier transform (DFT), on a captured image of the main face of the test piece, the captured image being configured with a bright region and a dark region arranged in a checkered pattern, wherein the bright region corresponds to a warp of the test piece, and the dark region corresponds to a weft of the test piece.

* * * * *